Sept. 25, 1923.
J. A. BESSEY, JR
1,468,793
SWITCH FOR CONTROLLING IGNITION CIRCUITS
Filed May 10, 1922   3 Sheets-Sheet 1
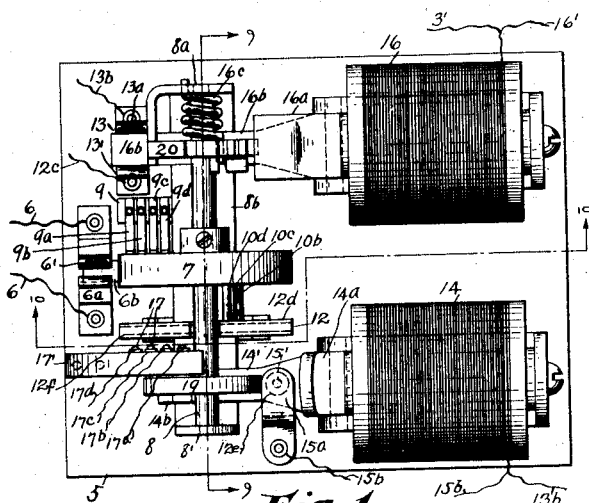
Fig. 1
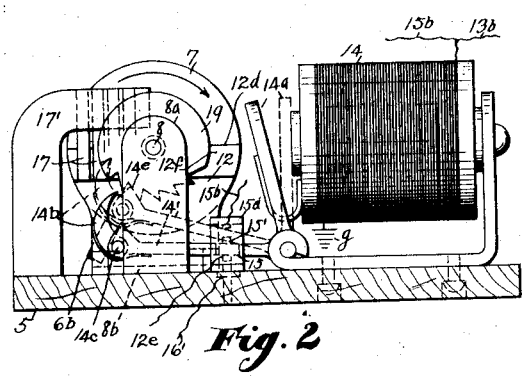
Fig. 2
Fig. 3
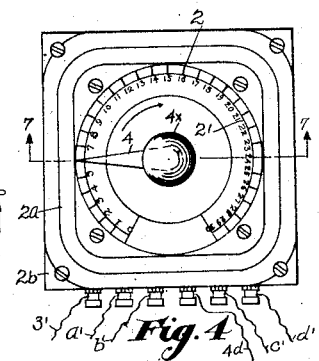
Fig. 4
Fig. 5
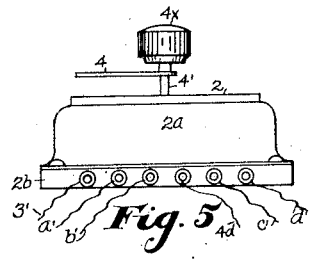
Fig. 6
Fig. 7
Inventor
James A. Bessey Jr.
By Harry D Wallace
Attorney Sept. 25, 1923.  
J. A. BESSEY, JR  
1,468,793  
SWITCH FOR CONTROLLING IGNITION CIRCUITS  
Filed May 10, 1922  
3 Sheets-Sheet 2

Inventor
James A. Bessey Jr.

By Harry D. Wallace
Attorney

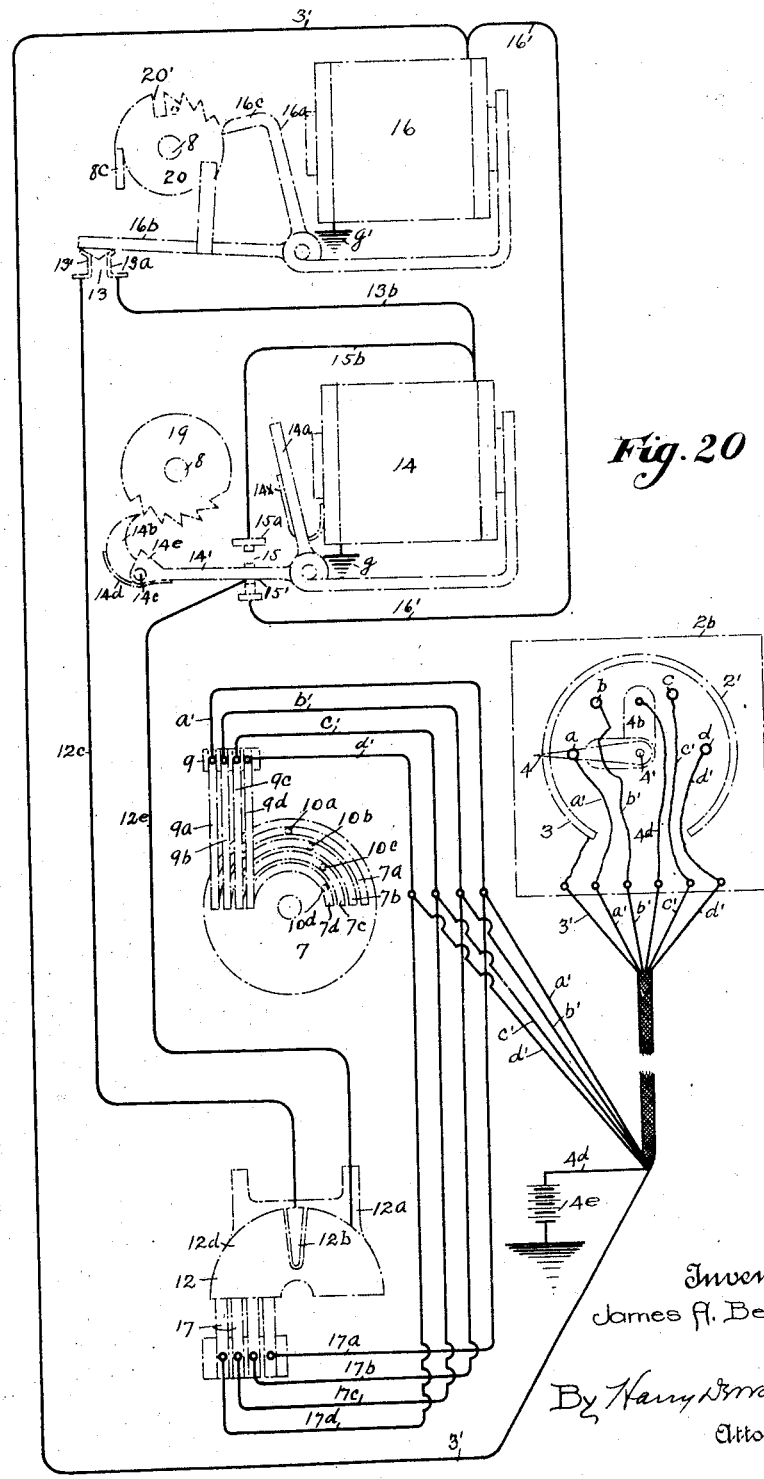

Patented Sept. 25, 1923.

1,468,793

UNITED STATES PATENT OFFICE.

JAMES A. BESSEY, JR., OF MARCELLUS, NEW YORK.

SWITCH FOR CONTROLLING IGNITION CIRCUITS.

Application filed May 10, 1922. Serial No. 559,894.

*To all whom it may concern:*

Be it known that I, JAMES A. BESSEY, Jr., a citizen of the United States, residing at Marcellus, in the county of Onondaga and State of New York, have invented certain new and useful Improvements in Switches for Controlling Ignition Circuits, of which the following is a specification.

This invention relates to a switch for controlling the ignition circuit of an internal combustion engine such as is employed for propelling motor vehicles.

The primary object of the invention is to provide novel and effective means for preventing theft or unauthorized use of a vehicle. A further object is to provide an electrically operated device of the class which depends for its operation upon the selection by the driver or the owner of the vehicle, of a certain combination of numbers, which may be inscribed upon a dial, for sequentially closing a series of local circuits which are arranged to operate a step-by-step mechanism, for effecting the closing of the ignition switch preparatory to starting the engine and operating the vehicle. A further object is to provide novel means for opening the ignition circuit when the vehicle is left standing on a street or in a garage. A further object is to provide novel means for preventing the closing of the ignition circuit and the operation of the vehicle except by a person who knows the combination and is able to sequentially close the local circuits corresponding to the combination numbers of the dial. And a further object is to provide novel means for releasing the ignition switch-closing mechanism in case a thief accidently makes the proper selection of a portion of the combination numbers, but mistakingly selects a wrong number before the combination is completed.

I attain these objects by the means set forth in the detailed description which follows and as illustrated by the accompanying drawings in which—

Figure 8:
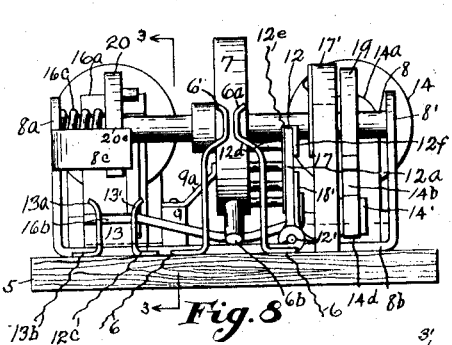
Figure 9:
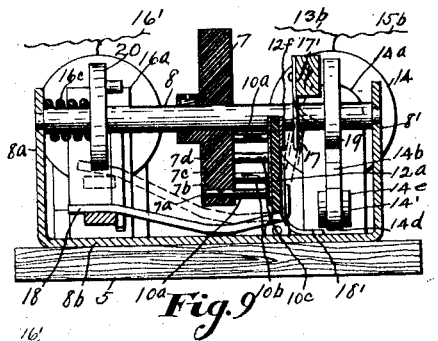
Figure 10:
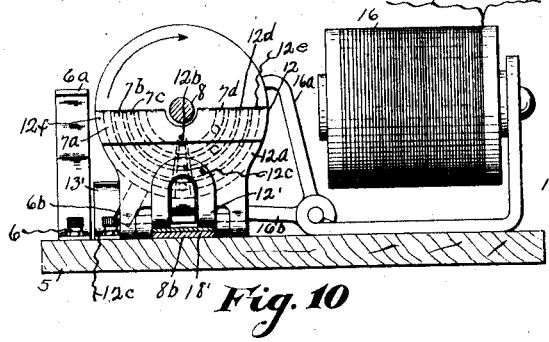
Figures 11, 12:
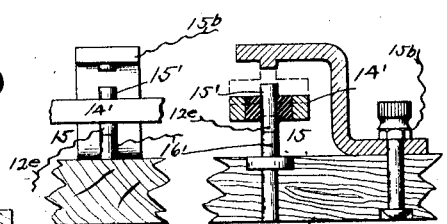
Figures 13, 14:
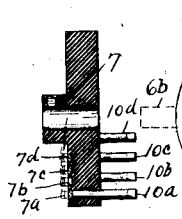
Figure 15:
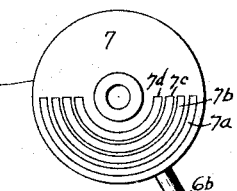
Figure 16:
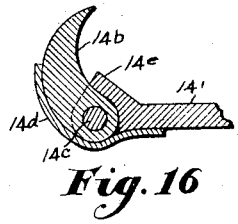
Figures 17, 18:
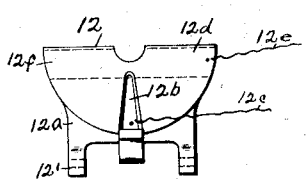
Figure 19:
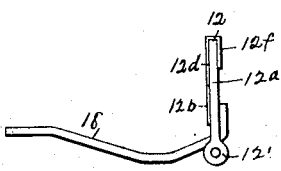

Figure 1 is a top plan view of the switch opening and closing mechanism detached from the indicating device. Fig. 2 is a front side elevation of the same, the base being in section. Fig. 3 is a vertical longitudinal section taken on line 3—3 of Fig. 8. Fig. 4 is a top face view of the dial by which the selective mechanism is controlled. Fig. 5 is a front side elevation of the same. Fig. 6 is a horizontal section taken on line 6—6 of Fig. 7. Fig. 7 is a central vertical section taken on line 7—7 of Fig. 4. Fig. 8 is a front end elevation of the device shown in Fig. 1. Fig. 9 is a vertical section taken on line 9—9 of Fig. 1. Fig. 10 is a vertical longitudinal section taken on line 10—10 of Fig. 1. Fig. 11 is an enlarged broken elevational view of the switch mechanism shown in Fig. 12. Fig. 12 is an enlarged broken sectional view of the switch shown in Fig. 11. Fig. 13 is a central vertical section taken on line 13—13 of Fig. 14. Fig. 14 is a front face view of the commutator shown in Fig. 13. Fig. 15 is a rear face view of the same. Fig. 16 is an enlarged broken sectional view of the pawl which actuates the switch closing mechanism, and a fragment of the operating lever. Fig. 17 is a rear face view of the rocking circuit breaker. Fig. 18 is a detached side view of the armature of the release magnet. Fig. 19 is an enlarged elevation of the pawl shown in Fig. 16. And Fig. 20 is a diagrammatic view of the circuits of the combined apparatus.

In the drawings, 2 represents a dial, upon which is arranged a broken circle of graduations 2', numbered, for example, from 1 to 30. The dial is preferably mounted on a casing $2^a$, which is supported by a base $2^b$ of any insulating material. Upon the top surface of the base is disposed a horse-shoe shaped contact or terminal 3, from which a wire 3' leads to the coil of the main device. Concentric to the contact 3 is arranged a circle of pins $3^b$, whose spacings are arranged in staggering relation to the graduations on the dial. At intervals within the circle of the pins $3^b$ are arranged four contacts $a, b, c, d$, which are arranged to register with corresponding graduations on the dial. These latter contacts and the numbers of the corresponding graduations represent a combination, which is intended to be known only to the driver or owner of a motor vehicle, and in order to prevent others from ascertaining the combination, these four contacts are obscured or hidden by the casing $2^a$. Wires forming parts of four local circuits, as $a', b', c'$ and $d'$ lead from said contacts to the main device. A pointer 4, which is operable by a knob $4^x$ is arranged to sweep the circle of numbered graduations on the dial, and is supported by a rotatable post 4', which is loosely journalled in a central perforation in the dial, and also in the perforated arm of a bracket $4^a$, which is mounted on the base within the casing $2^a$ (see Fig. 7). The lower or inner end of the post $4'$ engages the free end of a spring $4^b$, whose opposite end is rigidly secured to the top of the base. A wire $4^d$ leads from the spring $4^b$ to a battery $4^e$, which supplies current to all of the local circuits. The pointer and its support $4'$ are movable vertically reciprocably, as well as rotatably, as shown by the full and dotted lines in Fig. 7. The post $4'$ carries an arm $4^f$, which is positioned directly beneath the pointer 4 and is movable with the pointer and its support. This arm is disposed between the casing $2^a$ and the base $2^b$, and its free end is arranged to sweep the terminal 3, and also the combination $a$, $b$, $c$, $d$, whenever the pointer is rotated, and when the pointer and its support are depressed by the operator (see Fig. 7), the arm $4^f$ closes either the combination circuits $a'$, $b'$, $c'$, $d'$ or the common release circuit through the terminal 3 and the wire $3'$. The current for all of these circuits flows from the battery $4^e$ via spring $4^b$, post $4'$, and arm $4^f$, to whatever contact the said arm happens to engage, thence through the corresponding wire towards the main device, which will later be described. The full lines in Figs. 4, 5, 6 and 7 show the pointer positioned over the graduation 6 of the dial, which corresponds to the first combination contact, $a$, and the dotted lines in Fig. 7 show the pointer and related parts depressed, for bringing the arm $4^f$ into engagement with the said contact $a$, thereby closing the first combination local circuit, for effecting the first step in the closing movements of the ignition switch, as will later appear. By referring to Fig. 7, it will be seen that the combination contacts $a$, $b$, $c$, $d$ all extend above the level of the common terminal 3. By this provision, the selection of the combination contacts may be made, without danger of the ram $4^f$ accidently closing the release circuit, which is directly controlled by the terminal 3. When however, the pointer 4 is depressed while it is pointing to any of the other numbers on the dial than the four combination numbers, the arm $4^f$ engages the terminal 3, which operates the release mechanism, and thus prevents an unauthorized closing of the ignition switch and starting of the engine.

Referring to Figs. 1, 2, 3, 8, 9, and 10, the main device, which is controlled by the selective mechanism last described, consists of the following parts: 5 represents a base preferably comprising a nonconducting material, upon which the ignition switch-operating parts are mounted. The ignition circuit, as shown, comprises a broken wire 6, whose corresponding ends are connected to what will be referred to as the primary switch terminals $6'$ and $6^a$, which are preferably made of flexible or spring material, and are frictionally engaged by a knife $6^b$, for closing the switch, and thereby closing or making the ignition circuit, by which the internal combustion engine (not shown) is operated. The knife $6^b$ is carried by a rotatable part 7, the said knife being disposed radially, and projecting beyond the periphery of said part, and adapted when the disk 7 is rotated in the direction indicated by the arrows in Figs. 2, 10 and 14, to close the gap between the terminals $6'$—$6^a$, for closing the ignition circuit. The rotor 7 is rigidly mounted on a shaft 8, which is journalled in the spaced upright arms $8'$ and $8^a$, of a support $8^b$, which is rigid on the base 5. Upon one face of the rotor 7 are disposed concentric segmental contacts $7^a$—$7^b$—$7^c$—$7^d$, which are constantly in engagement with brushes $9^a$, $9^b$, $9^c$, $9^d$, the said brushes being mounted on a support 9, and being connected respectively with the wires $a'$, $b'$, $c'$ and $d'$, which lead from the selective, to the main operating mechanism. The rotor 7 also supports four brushes $10^a$, $10^b$, $10^c$, $10^d$, which connect with the segmental contacts $7^a$, $7^b$, $7^c$ and $7^d$. These latter brushes pass through, and project beyond the opposite face, of the rotor, and normally engage a rockable circuit-breaker 12, which is pivotally mounted on the base parallel to the rotor 7, by means of a hinge $12'$. The circuit-breaker 12 comprises an insulating body $12^a$, upon one face of which is mounted a terminal $12^b$, which connects by a wire $12^c$ with a terminal $13'$ of a split switch 13. The other spaced terminal $13^a$ of said switch connects by a wire $13^b$ with the coil of an electromagnet 14, hereinafter referred to as the combination coil, which is grounded at $g$. The same face of the circuit-breaker 12 is provided with another terminal $12^d$, which straddles the terminal $12^b$, and connects by a wire $12^e$, with a movable terminal $15'$ of a shunt-switch 15, the said terminal $15'$ being carried by an arm $14'$, of the armature $14^a$, of the combination coil 14, and when the said coil is de-energized, as shown in Figs. 1, 2 and 20, the terminal $15'$ shunts the current received from the terminal $12^d$ to a wire $16'$, which leads to the coil of an electromagnet 16, hereinafter referred to as the release coil. The switch 15 has another terminal $15^a$ which is engaged by the movable terminal $15'$ whenever the armature $14^a$ is attracted and connects with the coil 14 by a wire $15^b$. This latter circuit is a shunt employed for prolonging the energizing of said magnet 14 following the operation of said magnet by each combination local circuit and is employed for preventing the too sudden release of armature $14^a$ which closes the switch $15'$—$16'$ for operating the release coil 16. The release terminal $12^d$ has its top portion $12^f$ folded over the corresponding edge of the body $12^a$, and this folded portion is engaged by four brushes, which are given the common designation 17, whenever the circuit-breaker 12 is swung away from the brushes 10ª, &c. carried by the rotor 7, as shown by the dotted lines in Fig. 9. The brushes 17 are supported by a bracket 17', and are connected by wires 17ª, 17ᵇ, 17ᶜ and 17ᵈ, with the corresponding local circuits comprising the wires $a'$, $b'$, $c'$ and $d'$, as best shown in Fig. 20. The release coil 16 has an armature 16ª, which is also provided with an arm 16ᵇ, the free end of the latter arm being arranged to close (knife-like) the switch 13, whenever the release coil is de-energized, as shown by the full lines in Figs. 1, 3 and 10, and by the dotted lines in Fig. 20. The rocking of the circuit-breaker 12, as last described, is effected by a lever 18, one end of which is rigidly attached to the breaker 12, while its free end rests upon the arm 16ᵇ of the release coil armature 16ª. Whenever the release coil is energized, the attraction of its armature 16ª lifts the lever 18 and thereby rocks the circuit-breaker 12 away from the rotor 7. This breaks the contact between the brushes 10ª &c. and the terminals 12ᵇ and 12ᵈ, and effects the contact of the release terminal 12ᵈ with the brushes 17, which tends to prolong the energizing of the release coil 16. Upon the opening of the release circuit a spring 18' carried by the part 12 forces said part and the release armature 16ª back to the full line position shown in Figs. 1, 3, 10 and 20.

The foregoing describes in detail the selective device, and its electric connections, with certain electrical and mechanical parts of the ignition switch closing and opening mechanism. The following describes the remaining parts of the main device and the operation of the combined apparatus.

Upon shaft 8 is rigidly mounted a mutilated ratchet wheel 19, having according to the present showing, four or more teeth. This will be referred to as the combination ratchet, and when operated in the direction of the arrow in Fig 2, rotates the shaft 8 and the rotor 7 step-by-step, for moving the knife 6ᵇ from the idle position, shown by full lines in Figs. 2, 8 and 10, to the dotted position shown in Figs. 1 and 14, which closes the ignition switch. This operation of the shaft 8 and related parts is effected by the attraction of the armature 14ª. For this purpose, the arm 14' of said armature is provided with a pawl 14ᵇ, which is pivoted by a pin 14ᶜ, and is resiliently held in the operatve position by a spring 14ᵈ (see Figs. 2, 16 and 19). The point of the pawl 14ᵇ is arranged to successively engage the teeth of the ratchet 19, for effecting the step-by-step rotation of the shaft 8. In order to hold the shaft 8 from rotating too far, by reason of the jerking attraction of the armature 14ª, the arm 14' is provided with a tooth 14ᵉ, which engages one of the idle teeth of the ratchet 19, and acts as a brake for preventing excessive movement of the said ratchet. The energizing of the combination coil 14, can only be effected by the closing of the local combination circuits, through the manipulation of the pointer 4, as described, and the said coil can only be energized for the rotation of the shaft 8, when the pointer is moved and brought into engagement with the combination contacts $a$, $b$, $c$ and $d$ sequentially. That is to say, the operator must first make contact at $a$, then at $b$, $c$ and $d$ in regular order. Otherwise the combination coil cannot be energized. The shaft 8 also supports another mutilated ratchet wheel 20, to be referred to as the release ratchet, which is provided with four teeth, the last tooth comprising a deep slot 20' as best seen in Figs. 3 and 20. The release ratchet 20 is operated in the direction of the arrows in Figs. 3 and 20, by the energizing of the combination coil, and is employed for holding the shaft 8 and related parts in the operated position during the step-by-step action, which is necessary to effect the closing of the primary switch 6'—6ª as well as during the periods in which the engine is running. For this purpose, the armature 16ª is provided with a stop-arm 16ᶜ, which, as long as the said armature is idle, is normally in contact with the release ratchet. Then as the said ratchet is rotated towards the release coil, the stop-arm 16ᶜ successively engages the teeth, and thereby holds the said ratchet and shaft 8 from recoiling, by the tension of a release spring 8ˣ (see Figs. 1, 8 and 9). When the fourth or last combination number has been selected in sequence, as described, and the shaft 8 has been rotated by the combination coil the four steps which correspond to said numbers, the stop-arm 16ᶜ drops into the slot 20' and positively locks the shaft 8 in the fully operated position, and permits the engine to be started and operated for driving the vehicle. The shaft 8 is limited in its rotation during the selection of the four combination numbers, to the four steps as measured by the teeth of the combination ratchet 19, which are engaged by the pawl 14ᵇ, and the said shaft is prevented from being rotated to a greater extent, by the stop-arm 16ᶜ engaging the slot 20' of the release ratchet 20. The recoil of the shaft 8, when it is released by the attraction of the armature 16ª, is arrested by a lug 8ᶜ carried by the upright arm 8ª of the bracket 8ᵇ, which engages a shoulder 20ᶜ of the ratchet 20 (see Figs. 3, 8 and 20).

When the parts are in the released or ready-to-operate position, shown by the full lines in Figs. 1, 2, 8, 9, 10, 13 and 14, the brush 10ª carried by the rotor 7, which corresponds to the first and lowest combination number, is alone in engagement with the combination terminal $12^b$, and the brushes $10^b$, $10^c$ and $10^d$ are all in engagement with the release terminal $12^d$. As the combination numbers are selected in sequence by the pointer 4, the brushes $10^a$, &c. successively engage the combination terminal $12^b$, and thence move into engagement with the release terminal $12^d$, and when the four combination numbers are finally selected, all of the brushes 10 are in contact with the release terminal $12^d$. Upon the release and recoil of the shaft 8, which restores the parts to the positions first referred to, the brush $10^a$ is again in engagement with the combination terminal $12^b$.

Briefly, the operation of the switch mechanism is as follows: Assuming that all of the parts are in the positions shown by the full lines in Figs. 1, 2, 3, 4, 5, 6, 7, 8, 9 and 10, and by the dotted lines in Fig. 2, which indicate that the primary switch $6'$—$6^a$ is open, and the ignition circuit is broken, so that the engine cannot operate, the driver of the vehicle, preparatory to starting the engine, takes hold of the knob $4^a$, and swings the pointer 4 around to the number 6 of the dial, which corresponds to the first combination contact $a$, as shown in Fig. 1. He then depresses the pointer, which brings the arm $4^f$ into engagement with the contact $a$. This closes the first combination circuit from the battery $4^e$, via wire $4^d$, spring $4^b$, arm $4^f$, contact $a$, wire $a'$, brush $9^a$, segment $7^a$, brush $10^a$, terminal $12^b$, wire $12^c$, terminals $13'$ and $13^a$ of switch 13, wire $13^d$ and coil 14 to the ground at $g$. This causes the attraction of the armature $14^a$, tilting its arm $14'$ upwardly, and causing the pawl $14^b$ to rotate the ratchet 19 the extent of one tooth (see dotted lines in Fig. 2). This correspondingly rotates the shaft 8, the rotor 7, and the ratchet 20, and moves the knife $6^b$ one step toward the primary switch $6'$—$6^a$. At the end of this slight rotation of shaft 8, the stop-arm $16^c$ engages the first or nearest tooth of the ratchet 20, and holds the shaft 8 and related parts in the partially operated position. The driver next swings the pointer 4 clock-wise to the graduation 11 and depresses the pointer. This closes the circuit which includes the wire $b'$, brush $9^b$, segment $7^b$, brush $10^b$, terminal $12^b$, wire $12^c$ to the switch 13, and wire $13^b$ to the coil 14. This again attracts the armature $14^a$, the pawl $14^b$ rotates the shaft 8 the extent of another tooth of the ratchet 19, and the knife $6^b$ moves another step nearer the primary switch $6'$—$6^a$. The arm $16^c$ then engages the next tooth in order of the ratchet 20 for holding the shaft 8 as before. The driver next swings the pointer 4 around to graduation 18, for similarly closing the local circuit $c'$, and finally to the graduation 24, for closing the fourth local circuit $d'$. This completes the selection of the four combination numbers, and effects the four-step operation of the shaft 8, which moves the knife $6^b$ into engagement with the terminals $6'$—$6^a$ of the primary switch, thereby closing the ignition circuit. The engine may then be started for operating the vehicle.

When the vehicle is left standing on the street or put away in the garage, the driver simply depresses the pointer to any of the graduations on the dial, and a release circuit is made for energizing the release coil 16, and causing the recoil of the shaft 8, for opening the primary switch $6'$—$6^a$. If he chances to close, for example, the combination circuit $a$, the release circuit formed will be as follows: Battery $4^e$ to $a$, wire $a'$ to brush $9^a$, segment $7^a$, brush $10^a$, release terminal $12^d$, wire $12^e$, switch 15, wire $16'$ to coil 16, for releasing the stop-arm $16^c$ from the slot $20'$, and allowing the spring $8^x$ to restore shaft 8 and related parts, to the idle or starting position as described. If the driver depresses the pointer 4 and makes contact with the common terminal 3, the circuit is as follows: Battery $4^e$, spring $4^b$, arm $4^f$, contact 3, wire $3'$ to the coil 16, for withdrawing the stop-arm from the slot $20'$, and causing the recoiling of shaft 8, as described.

Every vehicle is supposed to have a different set of combination numbers and contacts as $a$, $b$, $c$, and $d$, and a greater or less number of contacts and local circuits than herein shown and described may be employed. The contacts and the arm $4^f$ being concealed in the casing of the selective device renders it practically impossible for a thief or stranger to the combination to make the correct selection and start the engine, since any mistake made in the selection of the combination contacts, or the accidental contacting of the lever $4^f$ effects the release of the rotary part 7 and restores the knife $6^b$ to the starting position.

Having thus described my invention, what I claim, is—

1. The combination of a selective unit having a dial, a pointer, and a plurality of hidden contacts adapted to be engaged by depressing said pointer, a rotor having a number of brushes in constant connection with said hidden contacts, a knife carried by said rotor, a primary circuit having spaced terminals disposed in the path of said knife, an electromagnet adapted to operate said rotor for effecting the contact of said knife with said terminals, an electromagnet adapted to release said rotor for breaking said circuit, and a rockable circuit breaker for selectively operating said electromagnets.

2. Means for opening and closing the ignition circuit of an internal combustion engine, comprising a switch having spaced terminals, a knife adapted for bridging said terminals for completing the said circuit, a rotatable member supporting said knife, an electromagnet for rotating said member step-by-step for moving said knife towards said terminals, a selective device comprising a dial, a pointer, and a plurality of concealed contacts, certain of said contacts adapted to be sequentially engaged by the manipulation of said pointer for effecting the energizing of said electromagnet, means for holding said member from recoiling during the step-by-step operation thereof, and a coil for releasing said holding means.

3. Means for opening and closing the ignition circuit of an internal combustion engine comprising a pair of spaced terminals, a knife for connecting said terminals, a step-by-step mechanism for moving said knife towards said terminals, a selective device comprising a graduated dial, a pointer and a plurality of hidden contacts, adapted to be engaged by a part movable with said pointer, a plurality of local circuits including said contacts adapted to be closed sequentially by the rotation of said pointer for effecting the step-by-step movement of said knife, a shaft supporting said rotor, a spring carried by said shaft and exerting its tension for moving said knife away from said terminals, means for holding said rotor against the tension of said spring during the sequential closing of said local circuits, and means for releasing said rotor for opening the ignition circuit.

4. A selective device including a dial, a pointer and a plurality of hidden contacts adapted to be engaged by the depression of said pointer for effecting the movement of said knife towards the ignition circuit terminals, tension means for normally holding said knife away from said terminals, a plurality of electric circuits adapted to be closed in sequence for moving said knife step-by-step towards said terminals, a circuit-breaker, brushes carried by said member adapted to successively engage a part of said circuit-breaker for completing said local circuits, a release coil, and an independent local circuit controlled by said pointer for energizing said release coil.

5. The combination with the ignition circuit having spaced switch terminals, and a mechanism for opening and closing said terminals, of a selective unit having a graduated dial, a pointer, and a plurality of hidden contacts adapted to be engaged by depressing said pointer, one of said contacts being common to all of the graduations on the dial, the other contacts independently registering with corresponding graduations of the dial comprising a combination, a contact arm movable with said pointer adapted to sweep, and when depressed to engage all of said contacts, and tension means for normally holding said arm away from said contacts.

6. In a switch opening and closing mechanism the combination with a primary circuit having spaced switch terminals, of a rotatable member, a knife carried by said member for bridging said terminals for closing said circuit, a release coil, an armature for said coil, a ratchet movable with said member, said armature adapted to engage said ratchet for holding said member in the operated positions, an electromagnet for operating said member step-by-step for moving said knife towards said switch terminals, a plurality of "local" circuits for energizing said electromagnet, a selective device for controlling said "local" circuits, means for selectively closing said circuits for effecting the step-by-step movements of said knife, means for effecting the recoil of said member for releasing said knife from said switch terminals whenever a wrong selection of the "local" circuits is made, and a release circuit controlled by said selective device adapted when closed to effect the opening of said ignition circuit.

7. The combination with a primary circuit having spaced switch terminals, of a knife for closing said switch, a rotor supporting said knife, a selective device comprising a dial having numbered graduations thereon, a pointer adapted to sweep said dial, a plurality of hidden contacts corresponding to certain numbers on said dial, circuits connecting said contacts with said rotor, a part movable with said pointer adapted to engage said contacts in sequence for moving said knife step-by-step towards said terminals, an independent contact common to all of the other numbers of said dial, an electromagnet for effecting the step-by-step movement of said rotor, a circuit breaker normally in electric contact with said rotor and having a part adapted to successively complete the circuits between said selective device, said rotor and said electromagnet, a release coil, said circuit breaker having a part adapted to complete a circuit from said independent contact to said release coil for effecting the movement of said knife away from said switch terminals, and means controlled by the energizing of said release coil for breaking the electric connection between said rotor and said circuit breaker.

8. A combination-controlled switch mechanism comprising a selective device having a dial provided with numbered graduations, a pointer for sweeping said dial, a closed casing, a plurality of electric contacts concealed by said casing, said contacts corresponding to certain numbers on said dial constituting a combination, a contact in said casing that is common to all of the numbers on the dial, means movable with the pointer adapted to be brought into engagement with all of said contacts whenever the pointer is depressed, a primary circuit having spaced switch terminals, a mechanism for controlling said primary circuit, an electric circuit connecting each of the combination contacts with said mechanism, means for operating said mechanism step-by-step for closing said primary circuit when said combination contacts are engaged in sequence, a release coil, means operated by said coil for effecting the opening of the primary circuit, an electric circuit connecting said common contact with said release coil whenever a wrong combination contact is engaged and also whenever said common contact is engaged, and a rocking member adapted to open the combination circuits and to close the release coil circuits and vice versa.

9. A combination-controlled switch closing mechanism including a selective device having concealed therein a plurality of electric contacts comprising a combination adapted to be engaged sequentially for closing a switch and having a single contact forming a part of a release coil circuit and having a contact arm adapted to engage all of said contacts, a primary circuit having spaced switch terminals, a knife for closing said terminals, a rotor having brushes adapted for making said combination circuits, a circuit-breaker having a terminal adapted to be successively engaged by said brushes for effecting the step-by-step movement of said knife towards said switch terminals, a release coil, said circuit-breaker having a terminal for connecting said single contact with said release coil, means for holding said rotor after each step-by-step operation, and means for energizing said release coil for releasing said holding means for opening said primary circuit whenever a wrong combination contact is engaged by said contact arm and also whenever said contact arm engages said single contact.

In testimony whereof I affix my signature.

JAMES A. BESSEY, Jr.